(12) United States Patent
Kathuria et al.

(10) Patent No.: US 7,590,668 B2
(45) Date of Patent: Sep. 15, 2009

(54) PAUSABLE BACKUPS OF FILE SYSTEM ITEMS

(75) Inventors: Vishal Kathuria, Woodinville, WA (US); Martin J. Sleeman, Redmond, WA (US); Robin Dhananjay Dhamankar, Redmond, WA (US); Hanumantha Rao Kodavalla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 11/106,838

(22) Filed: Apr. 15, 2005

(65) Prior Publication Data

US 2006/0235907 A1 Oct. 19, 2006

(51) Int. Cl.
*G06F 12/00* (2006.01)
(52) U.S. Cl. .................... 707/202; 707/204
(58) Field of Classification Search .......... 707/1–10, 707/100, 101, 200–205
See application file for complete search history.

(56) References Cited

U.S. PATENT DOCUMENTS

| | | | |
|---|---|---|---|
| 6,311,193 B1 * | 10/2001 | Sekido | 707/202 |
| 6,366,294 B1 * | 4/2002 | Cunningham et al. | 345/666 |
| 6,609,184 B2 * | 8/2003 | Bradshaw et al. | 711/162 |
| 6,732,293 B1 * | 5/2004 | Schneider | 714/15 |
| 6,751,789 B1 * | 6/2004 | Berry et al. | 717/130 |
| 7,155,465 B2 * | 12/2006 | Lee et al. | 707/204 |
| 7,158,991 B2 * | 1/2007 | Kekre et al. | 707/102 |
| 7,158,999 B2 * | 1/2007 | Pace et al. | 707/204 |
| 7,296,008 B2 * | 11/2007 | Passerini et al. | 707/1 |
| 2002/0107877 A1 * | 8/2002 | Whiting et al. | 707/204 |
| 2004/0139125 A1 * | 7/2004 | Strassburg et al. | 707/202 |
| 2004/0260973 A1 * | 12/2004 | Michelman | 714/13 |
| 2005/0246612 A1 * | 11/2005 | Leis et al. | 714/763 |
| 2006/0015696 A1 * | 1/2006 | Nguyen et al. | 711/162 |
| 2006/0053333 A1 * | 3/2006 | Uhlmann et al. | 714/2 |
| 2006/0085610 A1 * | 4/2006 | Iwamura et al. | 711/162 |

* cited by examiner

*Primary Examiner*—Wilson Lee
(74) *Attorney, Agent, or Firm*—Workman Nydegger

(57) ABSTRACT

The subject invention relates to systems and methods that enable pausing and/or resuming a backup of file system items. The items are backed up in an order based on a unique property associated with each of the items. When the backup is paused, the unique property associated with a last backed up item prior to the pause is stored. Additionally, a timestamp associated with a snapshot from which the backup was taken can be stored with the unique property. Upon being resumed, the backup can continue from the paused location via utilizing the stored unique property. The backup can be resumed either employing an original snapshot associated with a time prior to the pause or a second snapshot related to a subsequent time. The subject invention can perform an initial backup of file system items and/or an incremental backup of such items. Additionally, the subject invention can support backing up a file system at disparate levels of granularity such as, for example, an item level.

17 Claims, 10 Drawing Sheets

PAUSABLE BACKUPS OF FILE SYSTEM ITEMS

TECHNICAL FIELD

The subject invention generally relates to file systems, and more particularly to systems and methods that facilitate pausing and/or resuming a backup of items of a file system.

BACKGROUND OF THE INVENTION

Each year, computers are becoming more prevalently used in society, and a greater amount of information is being stored electronically via utilization of these computers. This electronic information needs to be protected. To safeguard electronic information, data is oftentimes copied to create a second version, or backup, of an original source. The data typically copied during a backup can be stored program code, data associated with a program, or a combination thereof. The backup can be stored on a hard disk, large capacity magnetic tape storage, optical disk media (e.g., CD-R, DVD-R, . . . ), or any type of storage media. The backup can be utilized to restore data, for example, in the case of damage or loss of a hard disk, corruption of data, etc. For instance, the backup can be restored to revert back to a previous version of data associated with the original source from a current version of the data that is corrupt.

When a backup of data of an original source has started, there can be occasions where the backup cannot proceed to completion. For instance, resources utilized for the backup can be necessary for a disparate application (e.g., CD-R drive is required to play a music CD, . . . ), there can be a lack of media on which to store the backup (e.g., exhaust available blank CD-R media, . . . ), or there can be a lack of space on a staging area. Currently, a number of storage products do not support resuming backups once stopped or paused. Additionally, in the case of a file system, conventional techniques resume a backup by attempting to compare contents of the backup with contents of the original source. Thus, for example, if a backup is being stored on CD(s), the CD(s) on which data was previously copied prior to the pause must be evaluated to identify data from the original source that has not been backed up and thereafter copy the identified data to available space on the same or disparate CD(s). Such a technique, however, is slow and requires all previous backed up portions to be available. Thus, a backup of a file system and/or items within the file system currently cannot be efficiently paused.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and methods that facilitate pausing and/or resuming a backup of file system item(s). The items to be backed up each have an associated unique property (e.g., path id, numeric identifier, item id, . . . ). The items are backed up in an order based on the unique property associated with each of the items. Additionally, the backup can be paused at any time for any reason. When the backup is paused, the unique property associated with an item backed up immediately prior to the pause can be stored. Additionally, a timestamp associated with a snapshot from which the backup was taken can be stored with the unique property. The backup can be resumed from the location in the order at which the backup was paused by utilizing the stored unique property. For example, upon resuming, a query can be executed to determine items that have a unique property subsequent in the order as compared to the stored unique property related to the last backed up item. The subject invention contemplates pausing and/or resuming the backup any number of times. Additionally, a backup can proceed to completion without being paused, for instance.

The subject invention can identify items to be backed up and locate the file system store(s) upon which these items are located. The subject invention can perform an item level backup. A snapshot of the identified file system store(s) can be generated. Thus, the items can be copied from the snapshot as opposed to the file system store(s). Depending on whether a snapshot is available after a backup is paused, a new snapshot can be generated for each disparate backup session. The backup starting or resuming indicates the beginning of a backup session and the backup pausing or being completed identifies the end of a backup session. Each snapshot has an associated timestamp related to a time that the snapshot was generated. The timestamp can be associated with the last item backed up during a backup session, and this association can be stored as part of a backup state. Thus, the backup state can comprise a number of these associations from multiple backup sessions.

The subject invention, for example, can support a full backup (e.g., initial backup) and/or an incremental backup. By way of example, the subject invention can incrementally backup file system items via utilizing the backup state. Pursuant to this example, the items that have been modified subsequent to a previous backup that was taken over multiple backup sessions can be identified by evaluating ranges of items and associated timestamps, which can be provided in the backup state. These identified items can then be saved as part of the incremental backup.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
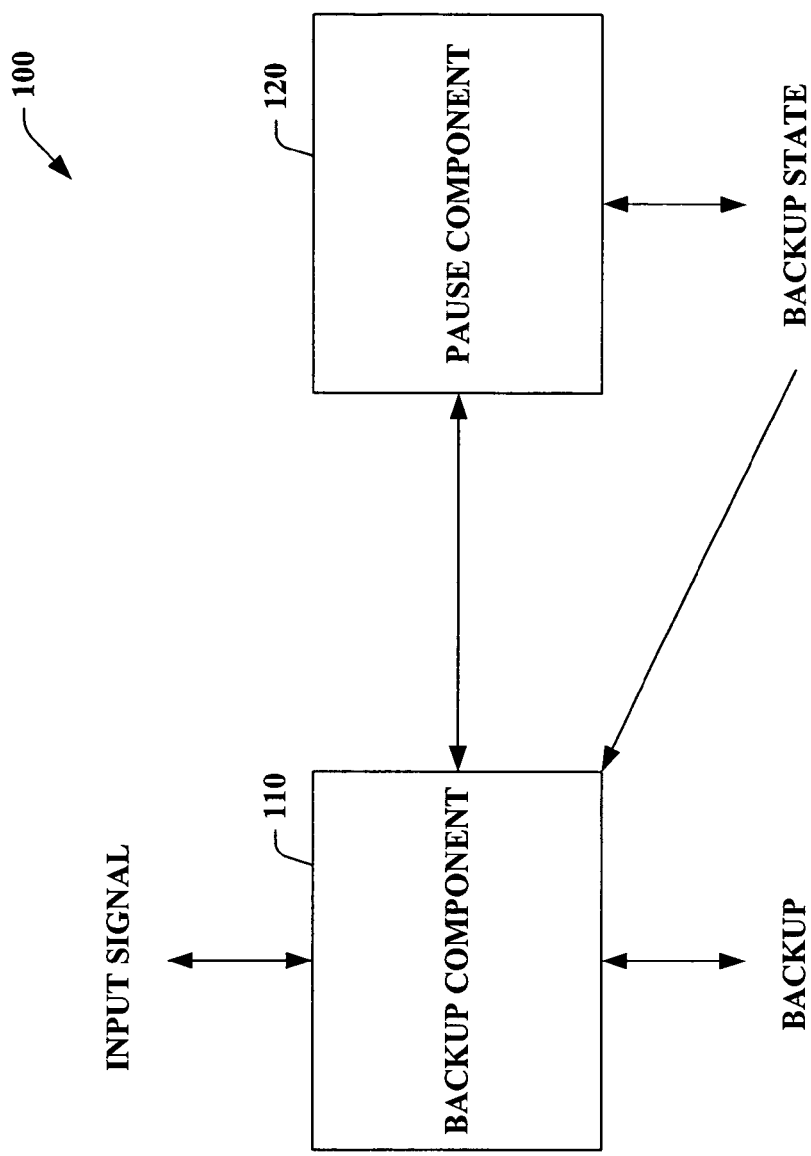
FIG. 1 illustrates a block diagram of a system that facilitates pausing a backup of file system item(s) in accordance with an aspect of the subject invention.

The subject invention relates to systems and methods that enable pausing and/or resuming a backup of file system items. The items are backed up in an order based on a unique property associated with each of the items. When the backup is paused, the unique property associated with a last backed up item prior to the pause is stored. Additionally, a timestamp associated with a snapshot from which the backup was taken can be stored with the unique property. Upon being resumed, the backup can continue from the paused location via utilizing the stored unique property. The backup can be resumed either employing an original snapshot associated with a time prior to the pause or a second snapshot related to a subsequent time. The subject invention can perform an initial backup of file system items and/or an incremental backup of such items. Additionally, the subject invention can support backing up a file system at disparate levels of granularity such as, for example, an item level.

As utilized in this application, terms "component," "system," "generator," "identifier," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

FIG. 1 illustrates a system 100 that facilitates pausing a backup of file system item(s) in accordance with an aspect of the subject invention. The system 100 includes a backup component 110 that copies item(s) of a file system to generate a backup and a pause component 120 that pauses the backup (e.g., halts the operation of the backup component 110 either temporarily or permanently) prior to completion. The backup component 110 receives an input signal that begins and/or resumes a backup. The input signal can be obtained from a user (e.g., via any user input device such as a mouse, keyboard, touchpad, touch screen, trackball, joystick, stylus, microphone, proximity sensor, motion sensor, temperature sensor, biometric input, . . . ), an application (e.g., a backup scheduler, an application that indicates the backup can continue, . . . ), a hardware device (e.g., an indication from a CD-R device notifying the backup component 110 that blank media has been made available, . . . ), etc. The backup component 110 generates a backup, which can be stored upon any type of storage media (e.g., hard disk, large capacity magnetic tape storage, optical disk media such as CD-R(s) and DVD-R(s), . . . ). The storage media, for example, can be external media, a network share, and/or a local storage (e.g., store that includes the file system, . . . ). The backup component 110 can backup an entire file system, a portion of a file system, or a number of items from a file system. The backup component 110 can generate an initial backup, a full backup and/or an incremental backup of the file system items.

The pause component 120 is coupled to the backup component 110 and can effectuate pausing the backup component 110 during the midst of a backup. Although depicted as separate components, it is to be appreciated that the backup component 110 can comprise the pause component 120. The pause component 120 can utilize an input signal that initiates a pause. For example, the input signal can be received from a user, an application, a hardware device, etc. By way of illustration, a user can interrupt a backup via making a selection from a user interface with a mouse, stylus, or any input device, which can produce an input signal directing the pause component 120 to stop the backup component 110. The input signal can be received by the backup component 110 and provided to the pause component 120 as depicted. Additionally, the subject invention contemplates that the pause component 120 can receive such a signal without passing it through the backup component 110.

When the pause component 120 stops (e.g., temporarily or permanently) the backup component 110, the pause component 120 provides information to a backup state that identifies how far the backup has already proceeded. The pause component 120 determines a unique property (e.g., path id, numeric identifier, item id, . . . ) associated with a last backed up item prior to the backup component 110 being paused; this unique property is stored as part of the backup state. The pause component 120 can additionally determine a timestamp (e.g., watermark) related to a backup session prior to the pause and/or store the timestamp with the unique property of the last backed up item in the backup state. The subject invention contemplates storing the backup state upon any storage media. For example, the backup state can be stored locally on a store that is being backed up via the backup component 110 or on any remote, networked, external, etc. storage media. The backup state can be stored in volatile memory, nonvolatile memory, or a combination thereof, for instance. The backup state can thereafter be utilized by the backup component 110 and/or the pause component 120 when operation of the backup component 110 is resumed to enable continuing the backup from the point at which it was paused. Thus, by utilizing the information in the backup state, the completed portion of the backup does not need to be examined to determine where to resume the backup. The pause component 120 also can pause a backup of file system item(s) any number of times during the backup.

The subject invention supports backing up data at disparate levels of granularity. For example, the backup component 110 can execute an item level backup, where the unit of granularity is an item. According to this example, the backup component 110 generates a backup of one or more items from a store. The backup component 110 can utilize the item level backup to backup all the items in a store. The item(s) that are backed up employing the item level backup can be chosen, for example, by a user, an application, etc. from all of the items of the store. Additionally, if no selection is made, a default group including any number of items can be backed up. By way of illustration, a user can choose to only backup emails. Subsequently, one or more of the backed up items can be restored (e.g., if the item(s) become corrupt, there is damage to a hard disk, . . . ).

As used in this application, a file system "item" comprises a core item, for example, a document or a contact, which can include property(ies) (e.g., title, display name). An item can be simple or compound (e.g., includes other item(s) embedded in it). For instance, a document can include an embedded spreadsheet that comprises data. Items can comprise additional information associated with the core item such as backing file(s), link(s) from the core item, extension(s), link id(s) of incoming link(s), security descriptor of the item(s), etc.

Figure 2:
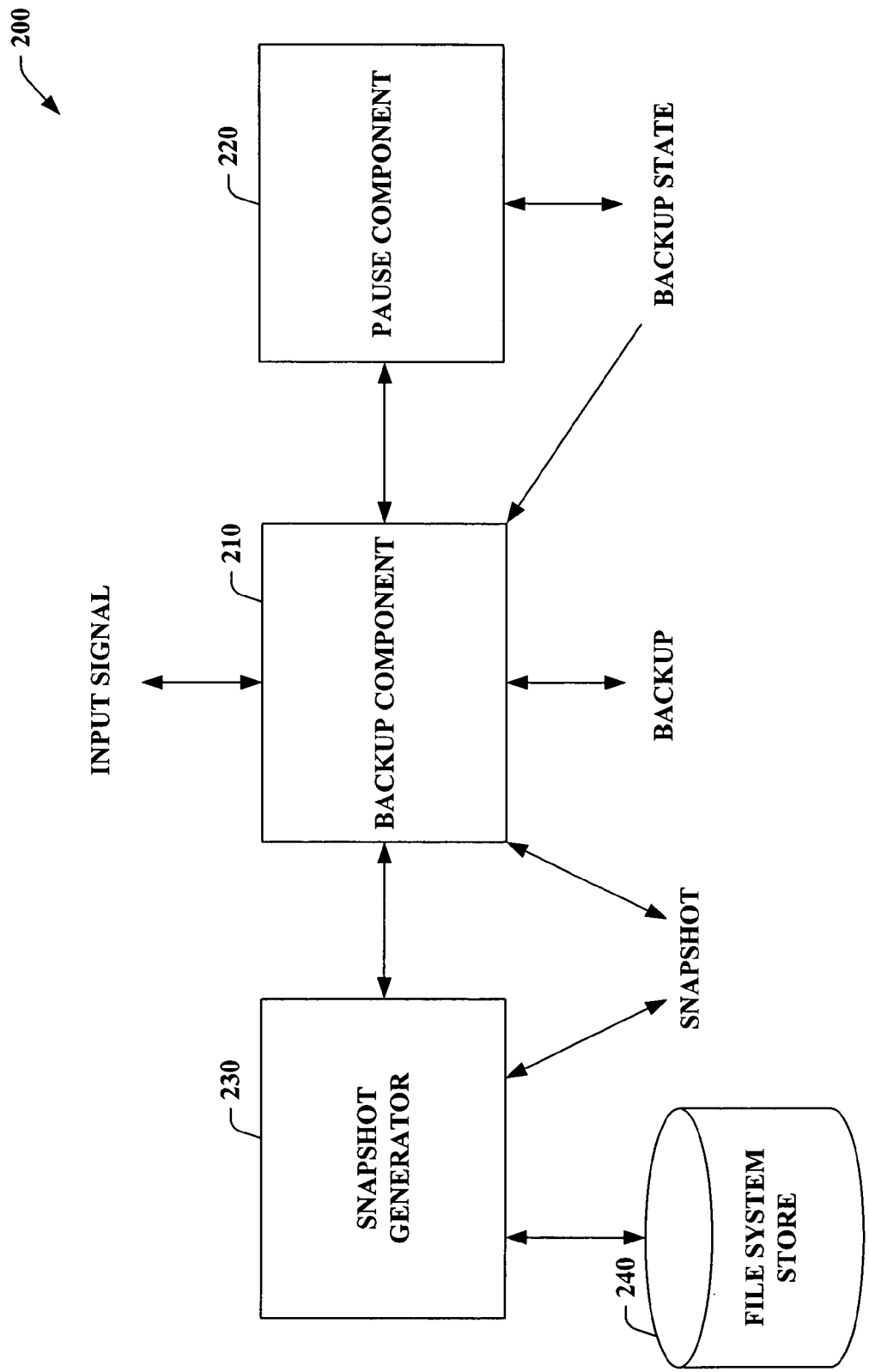
FIG. 2 illustrates a block diagram of a system that pauses and/or resumes a backup of file system item(s) in accordance with an aspect of the subject invention.

With reference to FIG. 2, illustrated is a system 200 that pauses and/or resumes a backup of file system item(s) in accordance with an aspect of the subject invention. The system 200 includes a backup component 210 that receives an input signal to start and/or resume a backup, and generates a backup of the file system item(s). The backup component 210 can be paused utilizing a pause component 220. The system 200 further comprises a snapshot generator 230 that produces snapshot(s) of a file system store 240 (which can be either volatile memory or nonvolatile memory, or can include volatile and nonvolatile memory). The backup component 210 utilizes the snapshot(s) to produce the backup.

The backup component 210 can identify items that are to be backed up. The backup component 210 can receive user input related to various file system item(s) to include in the backup. Additionally or alternatively, an application can provide an indication to the backup component 210 concerning item(s) to backup. According to another illustration, the backup component 210 can be provided with default criteria that determine items to backup. The item(s) to be backed up can be, for example, all items under a folder (e.g., \\mymachine\defaultstore\personal), all items in a store (e.g., \\mymachine\defaultstore), all items modified since a last backup (e.g., incremental backup), or a particular item (e.g., \\mymachine\defaultstore\MyContacts\David). The backup component 210 can provide this information to the snapshot generator 230. Alternatively, the backup component 210 can determine the file system store 240, or plurality of file system stores (not shown), that the item(s) of interest are stored upon.

The backup component 210 can initiate the snapshot generator 230 to create a snapshot of the file system store 240. The subject invention generates a snapshot from which the backup is taken for a number of reasons. Utilizing the snapshot, for example, mitigates being blocked behind applications that have acquired locks on items in a file system, facilitates capturing a consistent view of items at a particular point in time, and reduces interfering with other executing applications that otherwise would have occurred related to taking locks on items while the items were being read for the backup. The subject invention contemplates that the snapshot can be stored upon any storage media. The snapshot has an associated timestamp (e.g., watermark) related to a time at which it was created by the snapshot generator 230. Although the snapshot generator 230 is depicted, it is to be appreciated that the backup component 210 can utilize a timestamp associated with a start of a backup session instead of a timestamp related to a snapshot when updating the backup state upon a pause if the snapshot generator 230 is unavailable.

After the snapshot is generated, the backup component 210 can retrieve the item(s) of interest from the snapshot to create the backup. The backup component 210 generates the backup of the items from the snapshot in an order sorted by a unique property of the item. The unique property can be, for example, a path id, a numeric identifier, item id, etc. By way of illustration, the backup component 210 can copy items from the snapshot in order of respective path ids associated with each of the items.

The pause component 220 can halt the backup component 210 while it is creating the backup of the items. The pause component 220 stores the unique property associated with a last backed up item. For instance, the backup component 210 can begin to backup items (e.g., starting at path id 1). Later, the pause component 220 can pause the backup component 210 at any time (e.g., after the item at path id 500 has been backed up). Thus, the pause component 220 stores the unique property associated with the last backed up item (e.g., path id 500) as part of a backup state. This stored unique property can later be employed to resume the backup.

Figure 3:
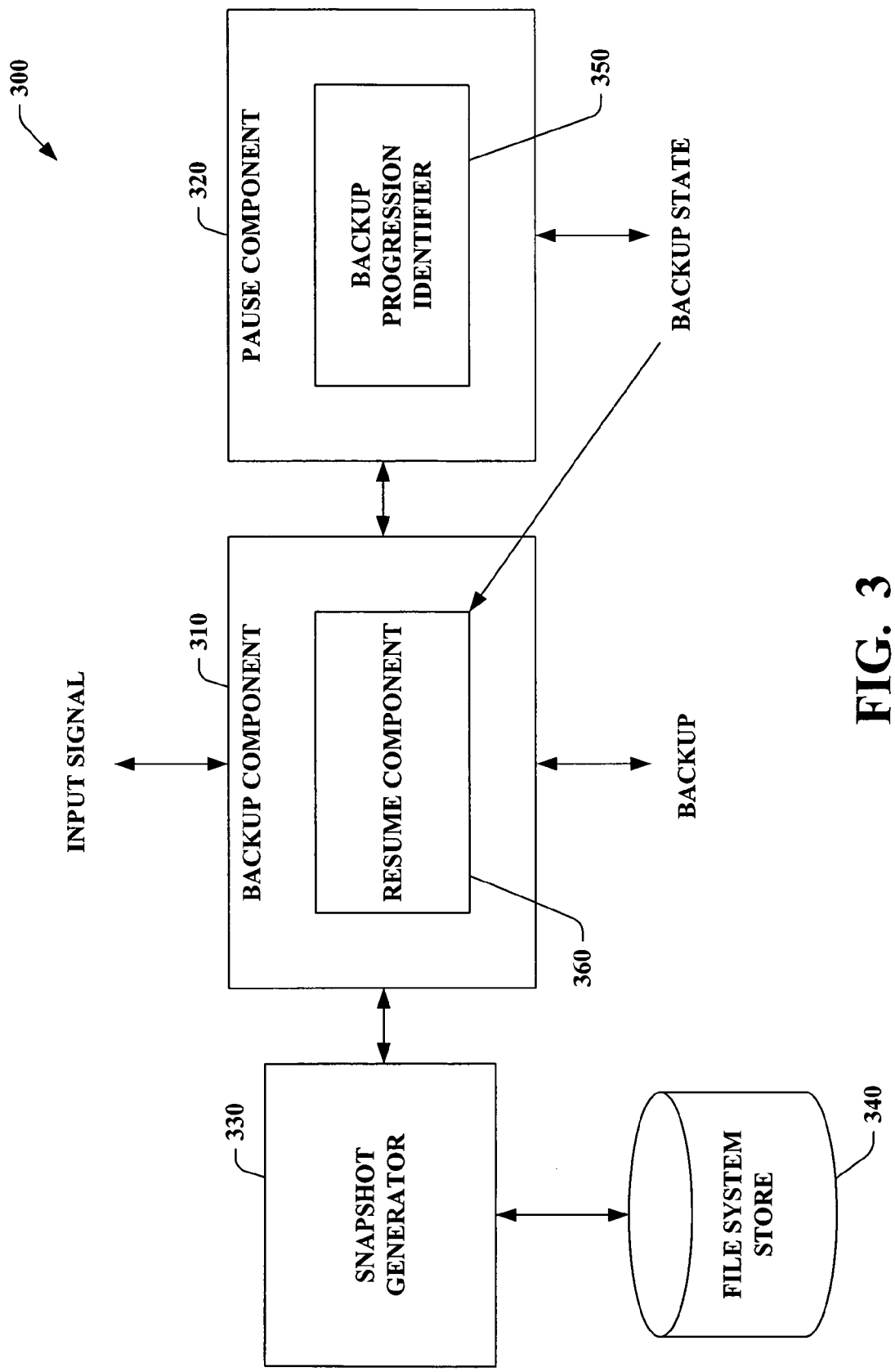
FIG. 3 illustrates a block diagram of a system that pauses and/or resumes copying of file system item(s) for a backup version of the item(s) according to an aspect of the subject invention.

Turning to FIG. 3, illustrated is a system 300 that pauses and/or resumes copying of file system item(s) for a backup version of the item(s) according to an aspect of the subject invention. The system 300 includes a backup component 310 that generates a backup of the file system item(s) when initiated via an input signal, a pause component 320 that pauses the backup component 310, and a snapshot generator 330 that produces a snapshot of a file system store 340 upon being initiated by the backup component 310.

The pause component 320 further comprises a backup progression identifier 350 that determines a point to which the backup component 310 has proceeded upon pausing a backup by the pause component 320. The backup component 310 backs up items from the snapshot in an order sorted by a unique property of the items. The backup progression identifier 350 determines the unique property (e.g., numeric identifier, path id, item id, . . . ) associated with a last backed up item prior to the pause. The backup progression identifier 350 additionally can identify a timestamp (e.g., watermark) associated with a snapshot generated for a particular backup session that ended as the backup component 310 stopped. A backup session is started when the backup begins or resumes and ends when a backup is paused or completed. The unique property (e.g., path id 500) associated with the last backed up item before the pause and the timestamp (e.g., timestamp 200) are stored as part of a backup state via the pause component 320, for example.

The backup component 310 further comprises a resume component 360 that resumes backing up the file system item(s) from the point where the backup was paused. The resume component 360 obtains the backup state, which includes data related to the unique property of the last backed up item. Upon resuming the backup, the resume component 360 can determine whether the snapshot generated via the snapshot generator 330 is still available. If the snapshot is still available, the backup component 310 can query for items that have unique properties subsequent in the ordering to the stored unique property (e.g., path ids greater than the stored path id 500) and backup these remaining, identified items.

If the resume component 360 determines that the snapshot is not available, the backup component 310 provides the snapshot generator 330 with an indication to generate a new snapshot. The new snapshot is created similarly to the original snapshot. The new snapshot and the original snapshot, however, are taken at different times (e.g., timestamp 200 and timestamp 220); thus, variations can exist between the data of the two snapshots. A disparate timestamp (e.g., timestamp 220) is associated with the new snapshot relating to a time at which the new snapshot was created. The backup component 310 thereafter can query the new snapshot in a manner similar to which the original snapshot is queried, such that items are identified that have unique properties subsequent in the ordering to the stored unique property. The backup component 310 can then resume generating the backup from the identified location within the ordering where the backup had previously been paused.

The pause component 320 can thereafter interrupt the backup any number of additional times. For each pause, the backup progression identifier 350 determines the unique property associated with the last item backed up prior to the pause and stores this information along with an associated timestamp related to the respective backup session. By way of example, items with path ids 1 to 500 can be backed up with a snapshot having a timestamp of 200 prior to the backup being paused via the pause component 320. When the backup continues, the resume component 360 obtains the path id of 500 for the item that was last to be successfully written into the backup prior to the interruption. The backup component 310 continues to generate a backup utilizing a newly generated snapshot at the next item (e.g., path id 501) in the order (e.g., sorted according to the unique property such as path id). This can be repeated with any number of interruptions. The backup, for instance, can be in a state where items with path ids 1 to 500 are backed up at timestamp 200, items with path ids 500 to 750 are backed up as of timestamp 220, and items with path ids 750 through completion are backed up as of timestamp 300. According to this example, the backup state would be as follows:

| PathID | TimeStamp |
|--------|-----------|
| 500    | 200       |
| 750    | 220       |
| NULL   | 300       |

Figure 4:
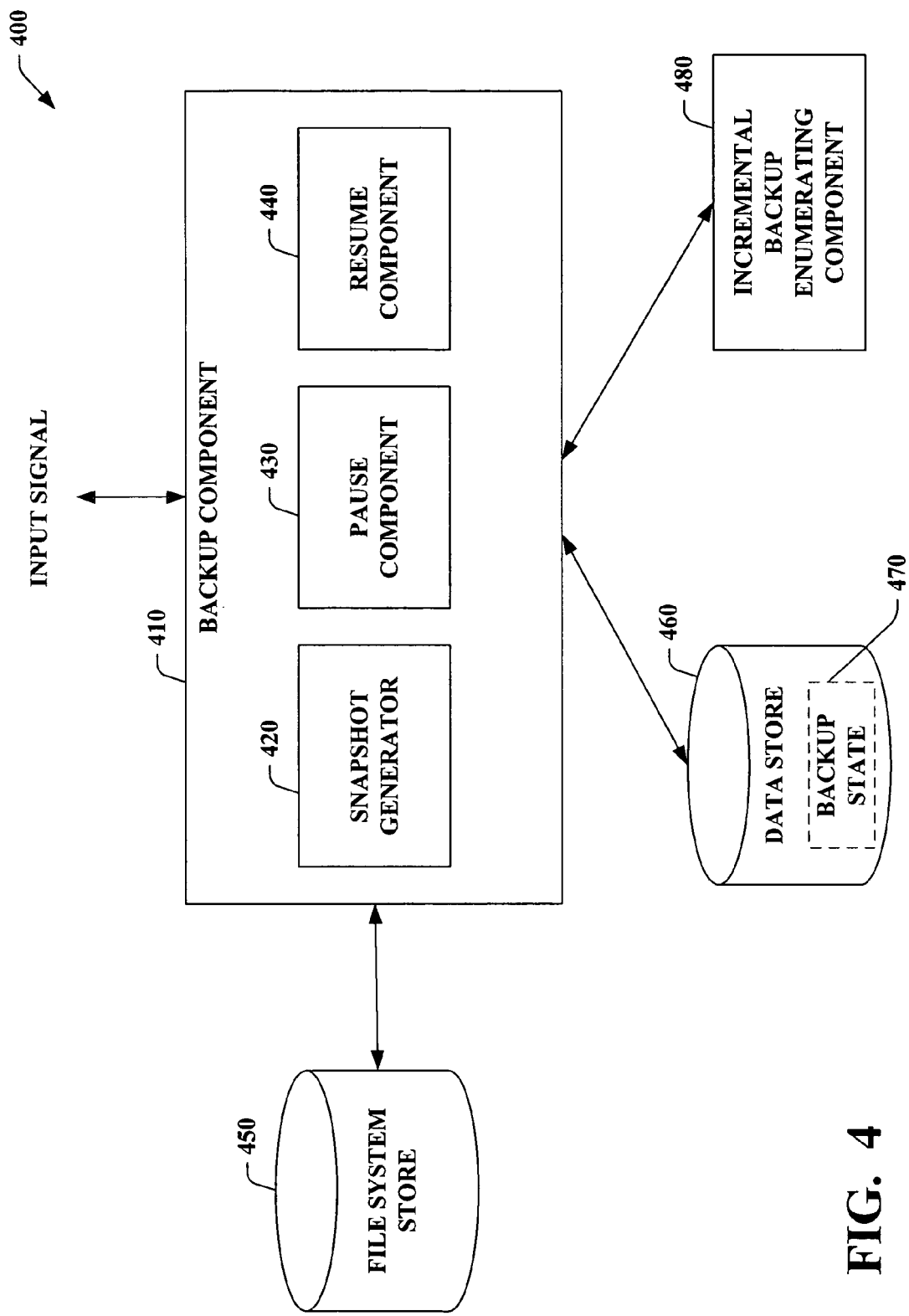
FIG. 4 illustrates a block diagram of a system that facilitates incrementally backing up file system item(s) in accordance with an aspect of the subject invention.

FIG. 4 illustrates a system 400 that facilitates incrementally backing up file system item(s) in accordance with an aspect of the subject invention. The system 400 includes a backup component 410 that comprises a snapshot generator 420, a pause component 430, and a resume component 440. The snapshot generator 420 can create a snapshot of a file system store 450 that includes item(s) to be backed up. As noted supra, the pause component 430 can halt a backup component 410 during a backup and provide an indication of an extent of the backup, and the resume component 440 can start the backup from the point at which the backup was paused utilizing the indication.

The backup component 410 can perform an initial backup and/or an incremental backup of item(s) from the file system store 450. An incremental backup can be utilized when it is desired to only back up item(s) that have changed since the last backup, instead of all item(s) in a selected scope. Incremental backups mitigate time required to conduct a backup and an amount of storage required upon which to store the backed up item(s). Traditionally, incremental backups could potentially be achieved by comparing a last modified timestamp on a file with the time that a snapshot for a backup was taken. If the last modified timestamp is later than the backup time, then the file is included in an incremental backup. Conventional techniques, however, are unable to evaluate multiple timestamps and return all items modified since their respective timestamps.

The backup component 410 can perform an initial backup of items from the file system 450. As the initial backup is generated, the pause component 430 and the resume component 440 can respectively stop and start the backup. The pause component 430 can provide information related to a last backed up item prior to a pause (e.g., unique property) and a timestamp (e.g., watermark) for a backup session that ended with the pause associated with each stoppage of the backup (e.g., via the backup progression identifier 350 of FIG. 3). This information can be stored upon a data store 460 as part of a backup state 470. Thus, the backup state 470 is a collection comprising unique properties of items backed up immediately prior to a pause and associated timestamps related to the backup session prior to each pause. The data store 460 and the file system store 450 are depicted as being disparate stores; it is to be appreciated, however, that the data store 460 and the file system store 450 can be both comprised as parts of the same store (not shown). Furthermore, a portion or the entire generated backup can be stored upon the file system store 450, the data store 460, and/or a disparate data store (not shown).

The file system store 450 and/or the data store 460 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The subject invention contemplates that the file system store 450 and/or the data store 460 can additionally or alternatively be a hard disk, a large capacity magnetic tape storage, optical disk media (e.g., CD-R, DVD-R, . . . ), or any type of storage media. The file system store 450 and/or the data store 460 of the subject systems and methods is intended to comprise, without being limited to, these and any other suitable types of memory.

The backup component 410 can receive an input signal indicating that an incremental backup is desired to be performed. The backup component 410 retrieves the backup state 470 of a last backup from the data store 460. The backup component 410 provides the backup state 470 of the last backup to an incremental backup enumerating component 480, which can identify item(s) that have changed since they were backed up. The backup enumerating component 480 can return the unique property (e.g., path id, numeric identifier, item id, . . . ) of an item in the following examples: the item has been updated, any reference relationship or embedding relationship where the item is the source has been updated, a holding relationship where the item is a target has been updated, an extension of the item has been updated, etc.

By way of example, the backup state 470 can include the following data from the aforementioned example:

| PathID | TimeStamp |
|--------|-----------|
| 500    | 200       |
| 750    | 220       |
| NULL   | 300       |

Pursuant to this example, the incremental backup enumerating component 480 returns the path ids of all items with path ids less than or equal to 500 that have been modified after timestamp 200, all items with path ids greater than 500 and less than or equal to 750 that have been modified since timestamp 220, and all items with path ids greater than 750 that have been modified subsequent to timestamp 300. It is to be appreciated that the subject invention is not limited to the use of path ids; any unique property (e.g., numeric identifier, item id, . . . ) associated with the items can be utilized. Thus, the incremental backup enumerating component 480 evaluates a number of subsets of items from a set of all backed up items and times that correspond to each of the subsets. The subject invention facilitates compressing the backup state 470 via storing a timestamp associated with each item range as opposed to every item that is backed up. The backup component 410 can utilize the returned unique properties (e.g., path ids, numeric identifiers, item ids, . . . ) to incrementally backup the corresponding file system items.

The backup component 410 can be interrupted via the pause component 430 as it is performing an incremental backup. Continuing the above example, assuming that a snapshot from which the backup was being taken had a timestamp of 390 and the incremental backup had proceeded to path id 720 before being interrupted, then the following represents the new backup state 470 of the items in the backup:

| PathID | TimeStamp |
|--------|-----------|
| 720    | 390       |
| 750    | 220       |
| NULL   | 300       |

After the incremental backup is resumed via the resume component 440 (e.g., at timestamp 450), if the backup reaches completion without being paused again, the new backup state 470 is as follows:

| PathID | TimeStamp |
|--------|-----------|
| 720    | 390       |
| NULL   | 450       |

The number of rows in this table associated with the backup state 470 is equal to the number of interruptions in the previous initial or incremental backup plus one. If no interruptions occur, there would be one row with a NULL path id, and the incremental backup enumerating component 480 would refer only to one timestamp.

The following is an example of pseudo code that can be utilized to obtain a latest watermark (e.g., timestamp) during a backup operation:

```
GetWatermark( )
    returns bigint
```

A list of unique properties associated with items that have been updated since a last backup can be obtained, for instance, utilizing the following pseudo code:

```
GetChangedItemIds (
    @watermark bigint
    @backupState varchar(max))
    returns TABLE (
```

-continued

```
ItemID    [System.Storage.Store].ItemId
Status    int)
```

Pursuant to this example, the Status field can indicate whether an entity is alive or dead and can utilize a value of 0 if the entity is alive and 1 or 2 if the entity is dead.

Additionally, a full backup of items can be performed utilizing the following pseudo code:

```
SELECT
    [SerializeItem](itemid,1)
FROM [System.Storage.Store].[master!Item]
ORDER BY
GetMaxPathHandle (itemid)
```

An example of pseudo code that can obtain a watermark (e.g., timestamp) associated with the full backup of items is:
SELECT GetWatermark( )

An incremental backup can store items that have changed since a time associated with a last watermark (e.g., timestamp). For instance, the following pseudo code can be employed to perform an incremental backup of these items:

```
SELECT
    [SerializeItem](itemid,1)
FROM [System.Storage.Store].[master!Item] m
JOIN GetChangedItemIds (backupState) c
ON m.itemid = c.itemid
WHERE c.status = 0
ORDER BY
GetMaxPathHandle (itemid)
```

A new watermark (e.g., timestamp) can be obtained, for example, utilizing the following pseudo code:
SELECT GetWatermark( )

Figure 5:
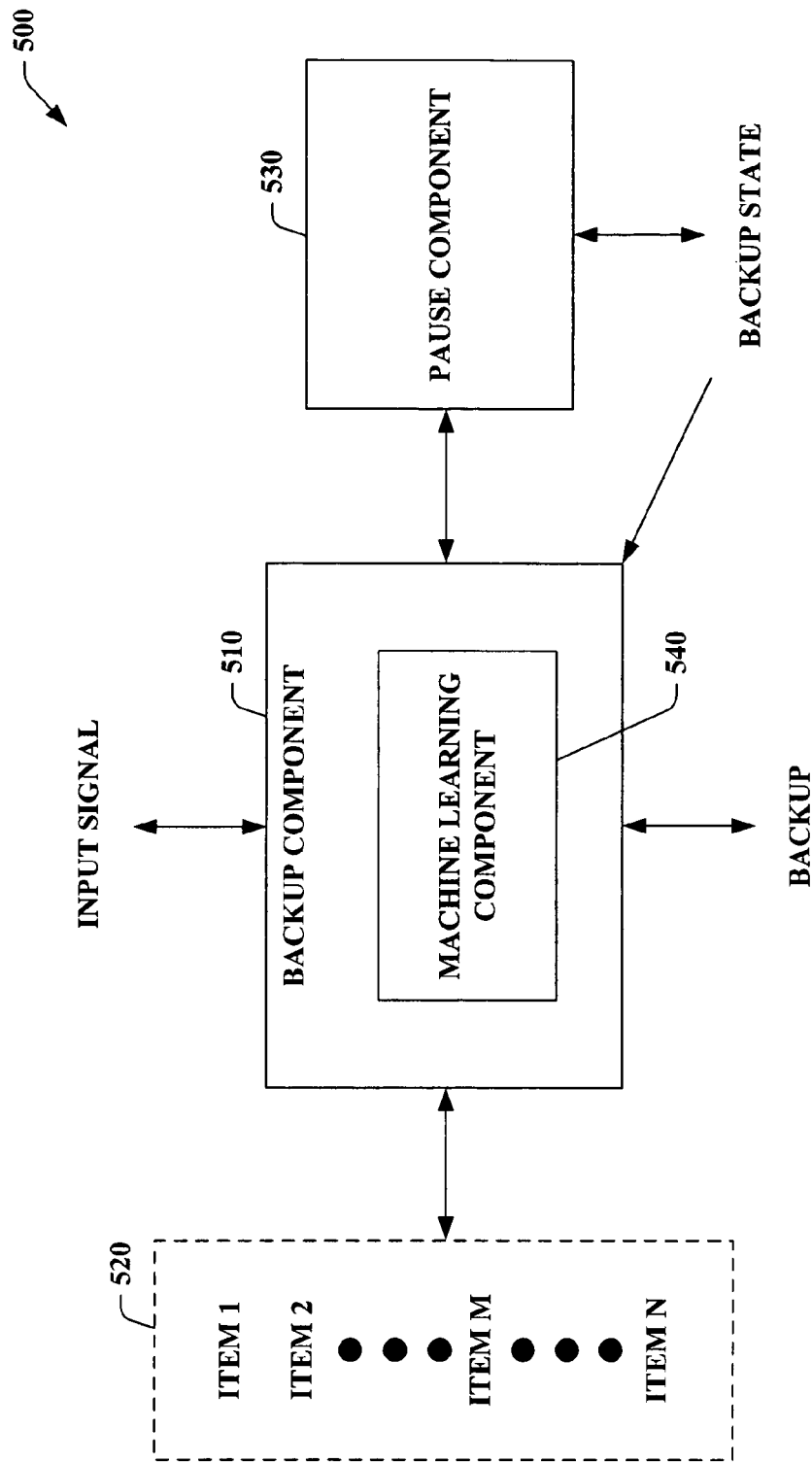
FIG. 5 illustrates a block diagram of a system that generates a backup of file system item(s) utilizing machine learning in accordance with an aspect of the subject invention.

With reference to FIG. 5, depicted is a system 500 that generates a backup of file system item(s) utilizing machine learning in accordance with an aspect of the subject invention. The system 500 includes a backup component 510 that receives an input signal that indicates when to start, pause, and/or resume a backup. The backup component 510 additionally yields a backup of the file system items 520. The system 500 also comprises a pause component 530 that can interrupt the backup component 510 during a backup of the items 520.

The backup component 510 generates a backup of the items 520 from a snapshot of the file system. The items 520 are stored for the backup in an order according to a unique property (e.g., path id, numeric identifier, item id, . . . ). Thus, when the backup component 510 writes each of the items 520 into the backup version, the items are written in sequence (e.g., first item 1, then item 2, . . . , item M (where M is an integer greater than 2), . . . , item N (where N is an integer greater than M)). According to an example, the pause component 530 can pause the backup component 510 immediately after item M is backed up such that item 1 through item M are stored based on a common snapshot. The pause component 530 can store a unique property associated with item M. When the backup component 510 resumes, it is determined that item M was the last backed up item via examining the stored unique property. Thus, the backup can continue from the point at which it was paused.

The system 500 further comprises a machine learning component 540, which can be employed by the backup component 510, the pause component 530 (and/or the snapshot generator 230 of FIG. 2, the backup progression component 350 of FIG. 3, the resume component 360 of FIG. 3, the incremental backup enumerating component 480 of FIG. 4, . . . ) in connection with pausing and/or resuming a backup of file system items. Machine learning refers to an area of artificial intelligence concerned with development of techniques that allow computers and/or programs to "learn." More particularly, machine learning can relate to methods for creating and/or modifying computer programs based at least in part upon an analysis of data set(s). Thus, the backup component 510 and/or the pause component 530 can operate more efficiently over time as more contextual data, user history, application history, and the like is collected.

Furthermore, the machine learning component 540 can make inferences relating to determining a location to which a backup has proceeded. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Thus, the backup component 510, the pause component 530 (and/or the snapshot generator 230, the backup progression component 350, the resume component 360, the incremental backup enumerating component 480, . . . ) given particular contextual data, can make inferences relating to backing up items 520. According to an example, the backup component 510 can employ the machine learning component 540 to infer when to initiate, pause and/or resume a backup. Additionally, the machine learning component 540 can be utilized by the backup component 510 to pause and resume backing up the items 520 at predefined intervals. The machine learning component 540 can also increase or decrease such intervals upon inferring the scarcity of system resources.

Figure 6:
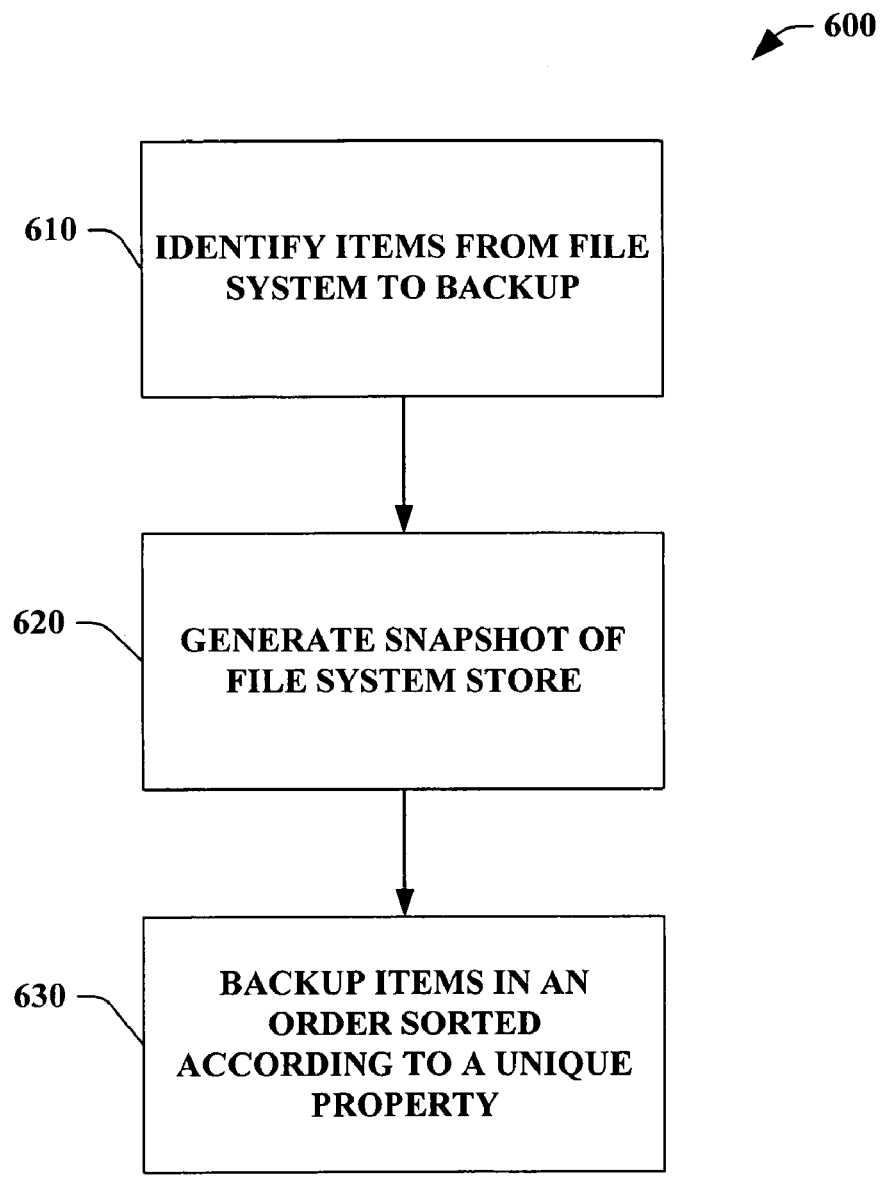
FIG. 6 illustrates a flow chart of an exemplary methodology that generates a backup of file system item(s) according to an aspect of the subject invention.
Figure 7:
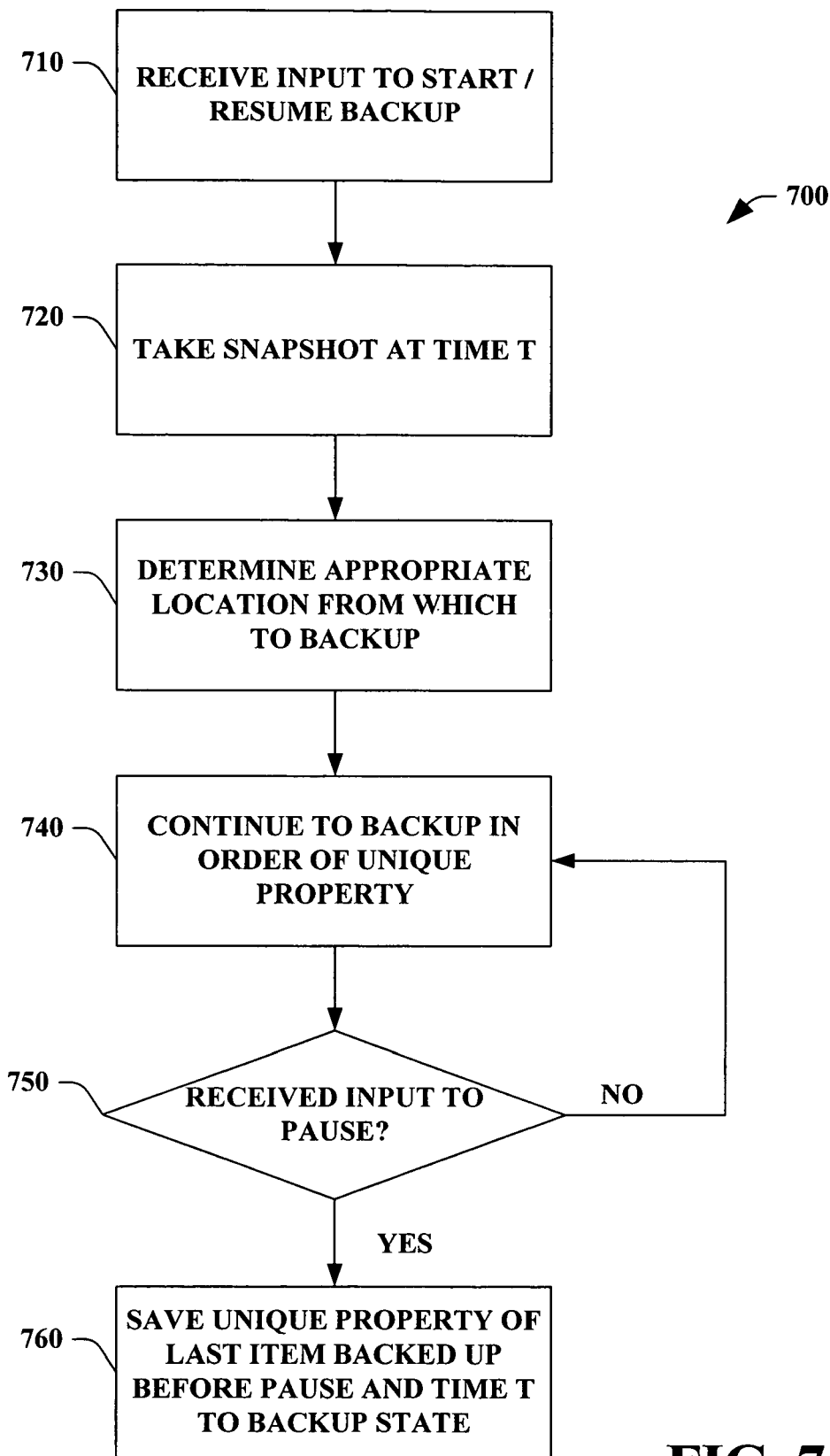
FIG. 7 illustrates a flow chart of an exemplary methodology that facilitates pausing and/or resuming a backup of file system item(s) in accordance with an aspect of the subject invention.
Figure 8:
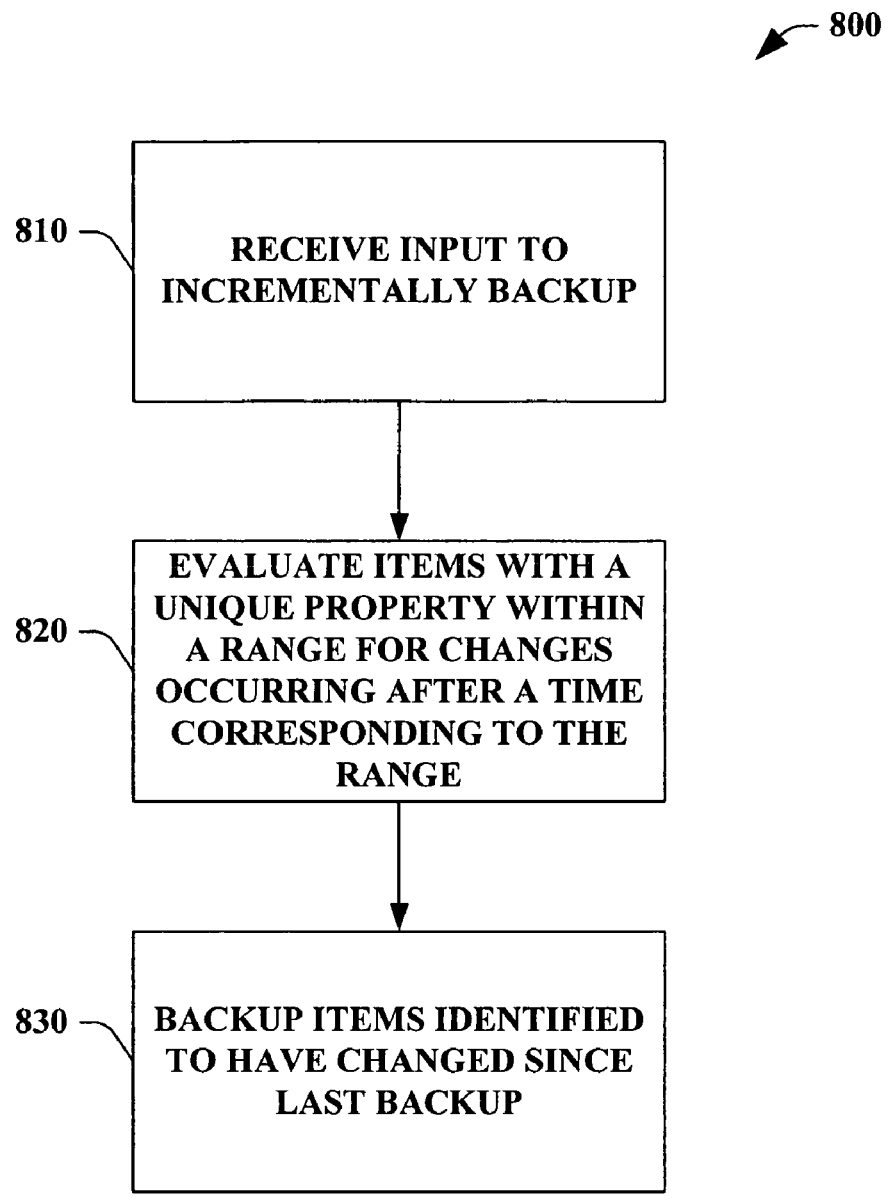
FIG. 8 illustrates a flow chart of an exemplary methodology that facilitates incrementally backing up file system item(s) in accordance with an aspect of the subject invention.

FIGS. 6-8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 6 illustrates a methodology 600 that generates a backup of file system item(s) according to an aspect of the subject invention. At 610, file system item(s) are identified to be backed up. The item(s) can be identified by a user, an application, or based on default criteria. For example, the item(s) identified to be backed up can be all items under a folder, all items in a store, all items modified since a last backup, or a specific item. A snapshot of the file store(s) that comprise the identified items is generated at 620. The snapshot is employed by a backup application to create the backup version of the items. Utilization of the snapshot as opposed to the file system store reduces being blocked behind items that have locks on items, enables evaluating items at a constant point in time, and reduces interference with applications that would otherwise be effected by items being read for backup. At 630, items are backed up in an order sorted according to a unique property (e.g., path id, numeric identifier, item id, . . . ) that individually identifies each of the items. If a backup is paused, a marker is saved that indicates a location in the order of items at which the backup stopped. Additionally, if the backup is resumed, the marker can be utilized to restart the backup at the same location.

Turning to FIG. 7, illustrated is a methodology 700 that facilitates pausing and/or resuming a backup of file system item(s) in accordance with an aspect of the subject invention. At 710, an input that starts and/or resumes a backup is received. The input can be received from a user, an application, a hardware device and/or can be based upon a default setting. A backup session begins as the backup is started or resumed. At 720, a snapshot of a file system store is taken at a time T. The items that are backed up are retrieved from the snapshot as opposed to the file system store. An appropriate location from which to start and/or resume a backup is determined at 730. The location can be determined based upon evaluating a backup state. The backup state can indicate a unique property (e.g., path id, numeric identifier, item id, . . . ) associated with an item, which was a final item successfully written to the backup prior to a pause. By way of illustration, the items are backed up in an order organized pursuant to the unique property; thus, the backup can resume with an item that is next in the order as compared to the final item backed up before the pause. Additionally, for a backup that is starting, the backup can begin from the first item in the order.

At 740, the items continue to be backed up in the order of the unique property. For example, the items can be backed up in order of path ids such that an item with a path id of 1 is backed up, followed by an item with a path id of 2, etc.; the subject invention, however, is not so limited. At 750, it is determined whether an input is received to pause the backup. If a signal to pause the backup is not received, the methodology 700 returns to 740 and continues to backup items in the order of the unique property until the backup is complete. When an input that pauses the backup is received, the unique property of the last item backed up before the pause and the time T associated with the snapshot are saved to the backup state at 760. The pause of the backup is the end of the backup session. A new backup session begins by returning to 710 (not shown).

FIG. 8 illustrates a methodology 800 that facilitates incrementally backing up file system item(s) in accordance with an aspect of the subject invention. At 810, an input is received that initiates performing an incremental backup of the file system item(s). The input can be received from a user, an application, a hardware device, etc. At 820, a backup state is evaluated such that items with a unique property within a range are inspected for changes occurring after a time corresponding to the range. By way of illustration, a first range of path ids from A to B can be associated with a time X and a second range of path ids from B to C can be related to a time Y. If the incremental backup is performed utilizing a snapshot taken at a time Z, then the items in the first range (e.g., items with path ids A to B) are evaluated to identify items that have been modified since time X and the items in the second range (e.g., items with path ids B to C) are examined to determine items that have been changed subsequent to time Y. At 830, items that are identified as having changed are backed up.

Figure 9:
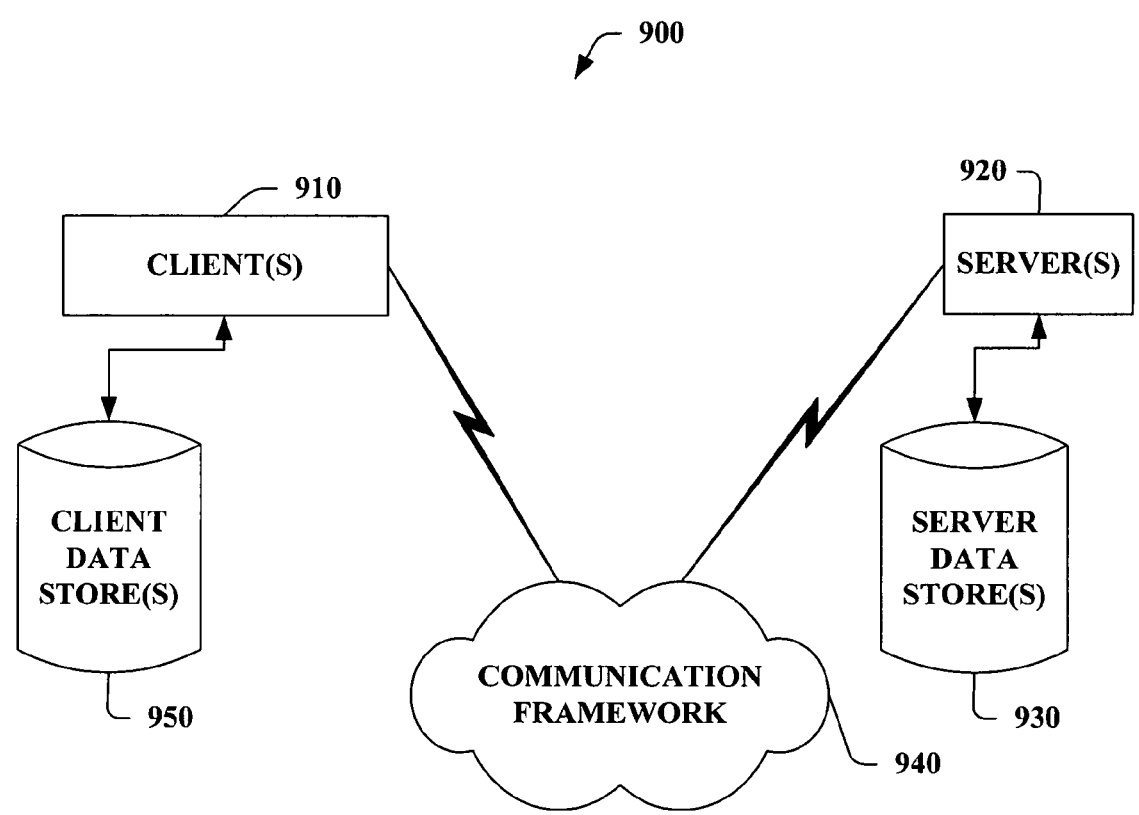
FIG. 9 illustrates an exemplary networking environment, wherein the novel aspects of the subject invention can be employed.
Figure 10:
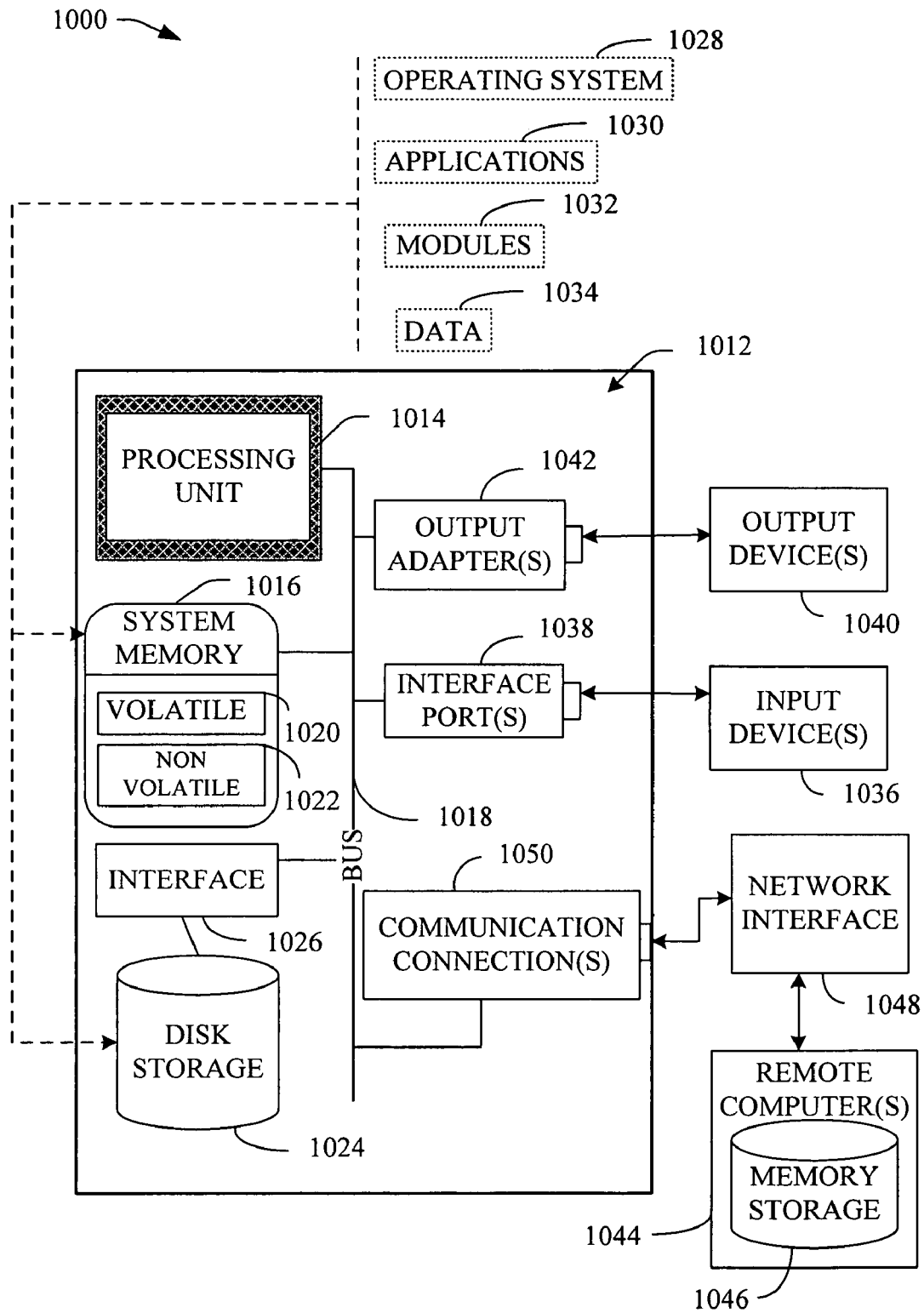
FIG. 10 illustrates an exemplary operating environment, wherein the novel aspects of the subject invention can be employed.

In order to provide additional context for implementing various aspects of the subject invention, FIGS. 9-10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computing system that facilitates pausing and resuming a backup of items in a file system store, the computing system comprising:
a processor; and
a storage medium storing executable instructions which, when executed by the processor, implement a method that includes:
taking a snapshot of items in a file system store that are to be backed up in a backup session;
identifying a unique property for each of the items in the snapshot and an order of the items in the snapshot based on the unique property associated with each item;
begin backing up the items from the snapshot according to the identified order that is sorted by the unique property of each of the items;
using a pause component of the computing system to pause the backup of the items at a certain point in the backup in response to a pause signal, wherein the certain point in at which the backup is paused corresponds to a last backed up item having a unique property;
storing the unique property of the last backed up item as part of a backup state of the backup session; and
subsequently resuming the backup of the items, in response to a resume signal, by commencing the backup from the certain point at which the backup was paused, by at least identifying the stored unique property of the last backed up item and by determining which of the items corresponding to the snapshot are subsequent in the identified order to the last backed up item, based on the unique property of each of the items, and by backing up the items that are determined to be subsequent in the order to the last backed up item, and such that the backup is enabled to resume from the certain point at which the backup was paused without having to completely reexamine a completed portion of the backup.

2. The system of claim 1, wherein the pause component associates the unique property of the last backed up item with a timestamp related to a time that the backup snapshot of a file system store was taken.

3. The system of claim 2, further comprising an incremental backup enumerating component that identifies items that have been modified subsequent to a previous backup that was taken over multiple backup sessions.

4. The system of claim 1, the unique property is at least one of a path id, a numeric identifier, and an item id.

5. The system of claim 1, further comprising a snapshot generator that creates the snapshot of a file system store for each backup session from which a backup component copies the items to produce the backup.

6. The system of claim 1, wherein the pause component halts operation of the backup component upon receiving an input from at least one of a user, an application, a hardware device, and a default setting.

7. The system of claim 1, wherein the backup component is utilized to identify items to backup from the file system.

8. The system of claim 5, wherein the backup component further comprises a resume component that utilizes a snapshot of a file store associated with a backup session prior to the pause to resume backing up the items from an appropriate location.

9. The system of claim 1, wherein a backup component queries a snapshot for items with an associated unique property subsequent in the ordering to the unique property of the last backed up item.

10. The system of claim 1, wherein a backup component executes at least one of an initial backup and an incremental backup.

11. The system of claim 1, wherein a backup component supports performing an item level backup.

12. A method that facilitates pausing and resuming a backup of file system items, comprising:

taking a snapshot of items in a file system store that are to be backed up in a backup session;

identifying a unique property for each of the items in the snapshot and an order of the items in the snapshot based on the unique property associated with each item;

begin backing up the items from the snapshot according to the identified order that is sorted by the unique property of each of the items;

using a pause component of the computing system to pause the backup of the items at a certain point in the backup in response to a pause signal, wherein the certain point in at which the backup is paused corresponds to a last backed up item having a unique property;

storing the unique property of the last backed up item as part of a backup state of the backup session; and subsequently resuming the backup of the items, in response to a resume signal, by commencing the backup from the certain point at which the backup was paused, by at least identifying the stored unique property of the last backed up item and by determining which of the items corresponding to the snapshot are subsequent in the identified order to the last backed up item, based on the unique property of each of the items, and by backing up the items that are determined to be subsequent in the order to the last backed up item, and such that the backup is enabled to resume from the certain point at which the backup was paused without having to completely reexamine a completed portion of the backup.

13. The method of claim 12, further comprising associating a timestamp related to a time that the snapshot was taken with the unique property of the particular item, and storing the association in the backup state.

14. The method of claim 13, further comprising identifying, for multiple ranges, items with a unique property within a range that have been modified after the timestamp corresponding to the range via utilizing the backup state.

15. The method of claim 14, further comprising backing up the identified items that have been modified.

16. The method of claim 12, further comprising at least one of fully backing up the items and incrementally backing up the items.

17. A computer readable storage media storing computer-executable instructions which, when executed by a processor, implement the method recited in claim 12.

* * * * *